March 1, 1927.
O. U. ZERK
LUBRICATING NIPPLE
Original Filed Nov. 21, 1922
1,619,455
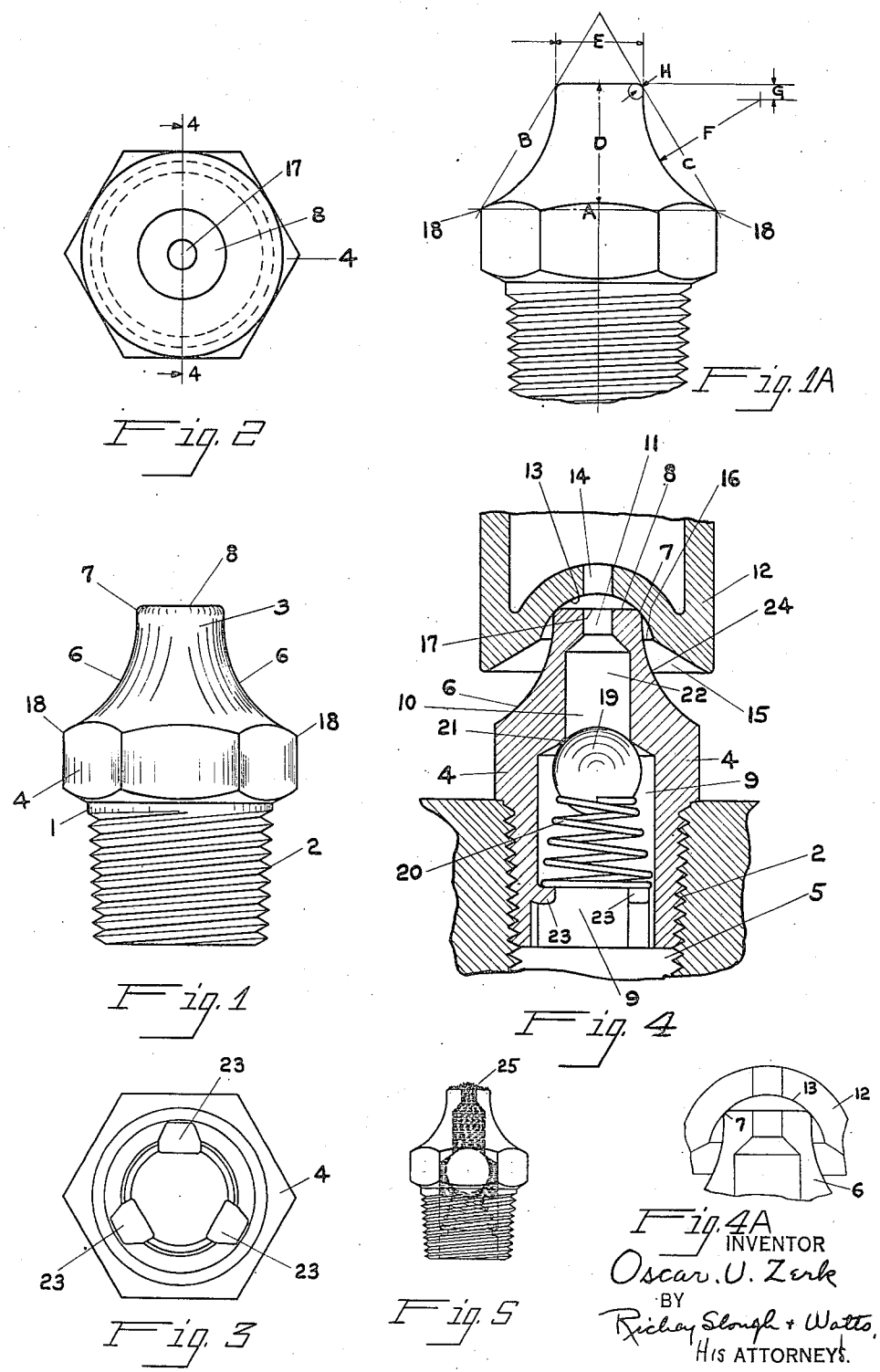

Patented Mar. 1, 1927.

1,619,455

UNITED STATES PATENT OFFICE.

OSCAR U. ZERK, OF DETROIT, MICHIGAN, ASSIGNOR, BY MESNE ASSIGNMENTS, TO THE BASSICK MANUFACTURING COMPANY.

LUBRICATING NIPPLE.

Original application filed November 21, 1822, Serial No. 602,465. Divided and this application filed July 30, 1924. Serial No. 729,038.

My invention relates to improvements in lubricating nipples and relates more particularly to improvements in lubricating nipples of the type which may be permanently mounted on machines contiguous to machine bearings of nearly all classes of machinery and which are adapted to receive lubricant from a discharge nozzle separable therefrom after the lubricant charging operation.

More particularly my invention relates to lubricant receiving nipples which are generally of the type shown and described in my issued Patent No. 1,475,980, dated December 4, 1923, and in which patent I claimed the combination with a nipple such as those herein shown, of a lubricant dispensing special nozzle cooperating therewith. In the present application I claim only those features of improvement limited to the nipple herein shown and described, per se, and as an article of manufacture, and by virtue of which improved nipple the following objects of the present invention are attained.

This case is a division of my application Serial No. 602,465 filed November 21, 1922, for lubricating apparatus, and a continuation in part of my applications Serial No. 649,701, filed July 5, 1923, and Serial No. 564,284, filed May 22, 1922.

A first object of my present invention is to provide a nipple of rugged construction adapted to be rigidly secured to a machine part adjacent a bearing surface to be lubricated, the construction of the nipple being such that it will deflect objects striking the nipple, and resist breakage of accidental removal even when mounted in exposed position, as, for instance, when mounted on the forward or rearward spring shackle bolts of a motor vehicle.

Another object of my invention is to provide a lubricant receiving nipple for a machine bearing which may be employed to receive lubricant from a charging nozzle without the necessity of first manually removing a dust cap from the end of the nipple. This preliminary operation required for prior constructions has been found to be very obnoxious in practice since the dust and lubricant invariably collecting over the exterior surface of such cap and adjacent parts becomes quite gummy and adhesive, and the operator cannot handle the cap without soiling his hands. I aim therefore also, to provide a lubricant receiving nipple which may advantageously be employed without the use of a dust protecting cap which, moreover, is often lost from the nipple during use of the machine, also, which is often misplaced during the period of removal during which the bearings of a machine are being lubricated.

Another object of my invention is to provide a nipple adapted to receive lubricant under relatively high pressures, the inlet opening of the nipple presented to the charging device being much smaller than those of nipples now commonly in use. In my improved construction, the small area of the inlet opening cuts down very materially the quantity of dust and grit which in earlier prior constructions is permitted to collect in considerable quantity over the inlet opening, thereafter trapped and projected inwardly through the nipple toward the machine bearings during the charging operation.

Another object of my invention is to provide a nipple in which the ball check valve is located well within the interior of the nipple and removed from the exterior end of the inlet opening so that dust and grit cannot collect on the ball or other form of check valve and perhaps conveyed by the lubricant to the bearing surfaces.

Another object of my invention is to provide a nipple having a narrow annular contact edge portion adapted to be received within a nozzle concavity of preferably parti-spherical conformation, and which is revoluble within certain limits of angularity while in contact with the said edges while pressed towards the same to prevent the loss of lubricant during the charging operation, this edge being sufficiently narrow that any particles of dirt or grit occurring between such edge and the parti-spherical surface of the nozzle will be pressed aside so that the tight lubricant closing contact between the edge of the nipple and the surface of the nozzle will not be impaired, and at the same time to provide such edge with such an effecting contacting area as will minimize deteriorating wear thereof.

Another object of my invention is to provide such a nipple having an intermediate portion of largest diameter or cross sectional area and tapering in the one direction toward the inlet opening, the tapered sides comprising a stop to limit the angularity of presentation of the nozzle parti-spherical contact surface aforesaid to the charging face of the nipple to prevent loss of lubricant.

An object also of my present invention is to provide a nipple which when charged by a nozzle having a charging face of such concave form that when pressed against the annular edge portion of the nipple charging face from all possible leak proof lubricant dispensing directions may only have the joint sealing pressure directed in such directions that such pressure will, if anything, tend to still more securely force the nipple into place in the opening rather than to tend to remove the nipple from the opening in the machine in which it is inserted.

Another object of my invention is to provide a nipple having a longitudinal bore, there being a plurality of successive portions of such bore of successively large diameters, the portion of smallest diameter being the inlet opening and the portion of largest diameter containing a check valve and a spring normally pressing the valve toward the inlet opening and against a valve seat, such seat being formed by the junction of a larger portion with a smaller portion.

Another object of my invention is to produce a nipple of the above character at a minimum cost of manufacture.

Other objects of my invention and the invention itself will be apparent from the description thereof which follows and in which description reference is had to the accompanying drawings forming a part of this application.

Referring now to the drawings:

Fig. 1 shows a side elevational view of an embodiment of my invention;

Fig. 1^A shows a like view;

Fig. 2 shows a top plan view thereof;

Fig. 3 shows a bottom plan view thereof;

Fig. 4 shows a longitudinal medial sectional view of the embodiment of the foregoing figures together with a similar view of a charging nozzle end portion adapted to be used in connection with the nipple of my invention;

Fig. 4^A shows in sectional outline the contacting portions of the nozzle and nipple of Fig. 4; and Figure 5 is a diagrammatic view illustrating the action of the grease in excluding dust from the interior of the nipple.

Referring now to the drawings, at 1 I show the body of a nipple having an externally threaded shank 2 and an inlet end 3, there being an intermediate preferably hexagonal enlarged mid-portion 4, the mid-portion 4 being adapted to receive the nut engaging surfaces of a wrench or other tool used for the purpose of screwing the nipple shank 2 into an opening 5 of a piece of machinery to place the nipple in proximity to a machine bearing. The shank 2 is preferably as shown approximately cylindrical in form though tapered slightly and the inlet end is curvilinearly tapered in external outline, the sides of the tapered inlet end being concavely curved as shown at 6, preferably from the enlarged mid-portion 4 to a contact edge portion 7 which surrounds the charging face 8 of the nipple.

The nipple so formed, as shown, is provided, preferably with a stepped longitudinal bore comprising a discharge portion of largest diameter 9 and intermediate cylindrical portion 10 and a charging inlet passage 11. The charging inlet passage 11 is adapted to receive lubricant from that type of lubricant charging nozzle forming portion of a contact pressure lubricating system such as the one having a nipple engaging end portion shown at 12, which is shown as having a concave parti-spherical contacting surface 13 perforated at 14 to form a discharge opening for the nozzle 12. Preferably the nozzle 12 will be of that type now commonly in use which has its end portion formed as shown which is usually mounted on the end of a lubricant dispensing gun as is illustrated and described in my said issued patent, and I preferably make the material of the nipple portion comprising the edge 7, of steel sufficiently hard to resist deformation when such edge is struck by extraneous objects; I also preferably curve this rounded edge for approximately one-fourth of a circle, so that such a parti-spherical nozzle contact face will invariably contact closely against it when pressed into contact with the end of the nipple. The circular contact edge 7 of the nipple is preferably a rounded edge, and all portions of it are transversely rounded on radii short enough to cause such edge to make a substantially "line" dirt cutting contact with the contact face of the metal nozzle face; such radii of curvature being preferably considerably less than half the diameter of the nipple contact face 8, and preferably about one-twelfth of such diameter. For instance in a specific instance which is a preferred embodiment of my invention wherein the contact face 8 is approximately three-sixteenths of an inch, the inlet opening 17 of the nipple, at the outer end of the passage-way 11, is preferably not flared but is formed preferably by the meeting of the flat face 8 meeting the cylindrical walls of the passage 11 at right angles, the area of the lubricant opening being made preferably at least as small as any transverse section of the passage 11; this contributes to minimizing the quantity of dust collectable over the opening for an inlet passageway 11 of a given transverse area.

The arrangement of inlet passages and interiorly disposed inwardly movable, and spring restored valve member, is operative to accomplish the result of projecting grease outwardly from the passage by the force imparted to the grease by the spring returned valve 19, acting as a piston, so that after each grease charging operation a "plug" of grease will project slightly over the opening 17 as shown at 25 in Fig. 5 so that the film of dust shown as collecting thereon over the opening will be carried beyond the opening and will be easily removed by brushing with a stick or brush, before another grease charging operation. This prevents the forcing of the collected dust particles into the interior of the passages 11 and 19, by such a preliminary cleaning operation.

The opening 17 is preferably made as small as is practical, being limited only by the resistance offered by the restriction to the entrance of lubricant under pressure, the liability of becoming clogged, and the difficulty of making very minute perforations through the material of the nipple contact face wall. I, therefore, make the contact face wall where the perforation resulting in the passageway 11 is to be made, very thin, this being for all purposes preferably not greater in linear dimension than the diameter of the opening 17. Thus the passageway 11, which offers some resistance to the flow of lubricant under pressure is made as short as its diameter and in some cases I contemplate making its length as short as one-fourth of the opening diameter. I find therefore that the nipple inlet opening may practically be made so small that its area does not exceed the enclosed area of a circle $\frac{1}{32}''$ in diameter. Smaller openings can be made and used but usually the advantage in minimizing the quantity of dust collected over the openings is not sufficiently great to justify the mechanical difficulties.

The diameter of the opening 17 is limited in size, by the quantity of dust which would collect over the opening and I find that for use on automobiles and without using a dust protecting cover for the nipple, and an extra nipple face cleaning operation prior to each charging of the nipple with lubricant, the diameter of the opening should not exceed $\frac{3}{32}''$ and preferably should be about $\frac{1}{16}''$. I prefer an opening diameter of $\frac{1}{16}''$, as a mean value, possessing the advantage of ease of manufacture with a very small dust collecting area.

The nipple of my invention has sides, on its inlet end, preferably curved as shown in the drawings, wherein such sides are shown concavely curved in all vertical sections all such curvatures being preferably arcs of circles curved on radii, F, and whose centers are disposed in a plane not substantially above, and preferably as shown in Fig. 1$^A$, slightly below the plane of the nipple circular contact edge as by a distance G, and parallel to such plane; such curvatures in extreme upper portions adjacent the attaching face being substantially at right angles to the plane of the contact edges, and the lower portions of such curvatures flaring outwardly, the inlet end being thereby made very rugged and strong, the length D of the tapered inlet end being made much shorter than the breadth A of its supporting base 4. The ratio of the length of the tapered inlet portion to the breadth of the supporting base portion 4 is preferably about 1 to 2 and should for purposes of proper rigidity be not substantially greater than 1 to 1; I am enabled to employ the smaller ratio by virtue of the concavely tapered sides formed as described, and in the preferred structure shown by making the radius of curvature, F, of all said vertical sections, preferably of about the same length as the length, D, of the concavely tapered end of the nipple. This relation gives the best results for connective purposes when a contact pressure lubricating nozzle is charging the nipple; the nozzle face being permitted to be pushed against the nipple only in such angular directions that preferably the pressure will be directed in a direction which will not tend to unseat the nipple from the opening in which it is screw-threaded or otherwise secured, the line of pressure preferably in all cases falling well within the bottom base portion 4.

Preferably also the nipple inlet end is so tapered, as shown in Fig. 1$^A$, that a triangle having as its base A a line passing through any two opposite points as 18—18 at the extreme bottom of the tapered portion and having its sides B and C projected therefrom to meet above the nipple inlet opening 17, and contacting only with the preferably rounded contact edges 7 will define an approximately equi-lateral triangle.

Within the larger bore portion 9, I preferably position a movable ball or other valve member 19, pressed by a spring 20 against the seat 21, the seat 21 being formed by the edge resulting from the meeting of the cylindrical walls 22 of the intermediate axial bore portion with the walls of the larger bore 9.

By providing a circular valve seat 21 of such relatively large diameter, as shown, a tighter valve closure can be conveniently secured and which will endure better and longer in use, than were this dimension smaller as it would have to be were the ball 19 reduced in size and placed adjacent and perhaps against the edges of the opening 17, which latter represents a common present practice. The greater size of the seat 21 as permitted by placing it at the lower end of an intermediate bore 22 permits a larger ball valve 19 to be used and to permit the seat to contact with the ball at points on its surface approximately 45°, distant from the center of the upper surface of the ball. This promotes a tight spring pressed wedging closure of the valve opening.

Referring to Fig. 4 showing a section of the nipple, it will be seen that the central opening of the nipple above the check has two diameters. A large one right above the ball and a smaller one above the larger diameter. These openings are provided with two differing diameters for the following reasons—if only one large hole is used then it would only leave an extremely thin wall at the top of the nipple; if a small hole would be drilled all the way through the center of the nipple, then the cost of manufacturing would run up quite considerable and it would be practically impossible to form a proper seat between a large ball and a small hole. Furthermore, if the diameter of the ball seat is reduced, the initial pressure required to open the valve seat must be correspondingly increased. In a specific case I make the area of the little $\frac{1}{16}''$ hole .003 square inches, and the area of the larger $\frac{5}{32}''$ hole, .019 square inches. The relation between these two areas is about 1:6, which would mean that if a ball of any diameter would seat on the $\frac{1}{16}''$ hole, more than 6 times the pressure would be necessary to open the ball check.

At 23 I show several spring supporting lugs broached from the material of the nipple itself adapted to support the spring 20 in such position that it will continually tend to press the ball 19 against its seat 21.

By using a nipple constructed as has been described, it will be observed that the size of the inlet contact face 8 and the degree of curvilinear taper of the inlet end 6 restricts the degree of angularity which may be had between the axis of the nipple and the axis of a charging nozzle of the type shown in Fig. 4 brought into contact therewith so that such a nozzle when presented from an angular direction will always maintain sealing lubricant proof connection with the nipple even when tilted to such an extreme degree of angularity wherein the periphery 16 of the nozzle spherical contact face 13 engages at a point 24 with the tapered sides of the nipple, such angularity being preferably about 25° from the perpendicular in any direction and when tilted to such an angle the enclosed space between the nipple contact face 8 and the charging nozzle face 13 will be maintained closed so that lubricant may pass from the nozzle to the nipple.

By constructing the nipple as herein shown, it will be observed that such a nipple may be made on an automatic screw machine, and the valve parts may be thereafter assembled into the nipple by automatic machinery whereby great economy in manufacture may be exercised.

Having thus described my invention in a specific embodiment, I am aware that certain various departures may be made from the embodiment herein illustrated and described, but without departing from the spirit of my invention.

I claim:—

1. As an article of manufacture, a fitting forming part of a contact pressure-lubricating system; said fitting comprising a body-member terminating at one end in a truncated conical portion having a flat end surface bounded by a circular dirt cutting edge, said body-member having a cylindrical bore extending therethrough, said bore increasing in diameter in successive stages.

2. As an article of manufacture, a fitting for forming part of a contact pressure-lubricating system; said fitting comprising a body-member terminating at one end in a truncated conical portion having a flat end surface bounded by a circular dirt-cutting edge, said body-member having a cylindrical bore extending therethrough.

3. As an article of manufacture, a fitting for forming part of a contact pressure-lubricating system; said fitting comprising a body-member terminating at one end in a truncated conical portion, the end surface of which is defined by a circular dirt-cutting edge.

4. As an article of manufacture, a fitting forming part of a contact pressure-lubricating system, said fitting comprising a body-member terminating at one end in a truncated conical portion having an end surface defined by an annular contact surface, and having concavely tapered sides uniting said end surface with the base of the conical portion, and a shank portion supporting said conical portion for securing the fitting to a machine part to be lubricated, there being a longitudinally extending passageway extending through said shank and conical portions, said passageway terminating in a small opening through said end surface.

5. As an article of manufacture, a fitting for forming part of a contact pressure-lubricating system; said fitting comprising a body-member terminating at one end in a truncated conical portion, the end surface of which is defined by a circular dirt-cutting edge, said circular dirt-cutting edge being transversely curved, the curvature in all portions being alike, and made on radii shorter than half the diameter of the fitting end surface.

6. As an article of manufacture, a fitting forming part of a contact pressure-lubricating system, said fitting comprising a body member terminating in one end in a truncated conical portion having an end surface defined by a dirt-cutting annular contact surface and having concaved tapered sides uniting said end surface with the base of the conical portion, and a shank portion supporting said conical portion for securing the fitting to a machine part to be lubricated, there being a longitudinally extending passageway extending through said shank and conical portions, the tapered sides in all vertical transverse sections being curved on radii having their centers adjacent to the plane of the conical portion end surface.

7. A fitting for a contact pressure-lubricating system having a bore with an open outer end and a check valve in said bore spaced from said outer open end and exposed to the pressure of the lubricant over an area greater than that of said outer open end.

8. As an article of manufacture, a fitting for a contact pressure-lubricating system comprising a body member terminating at one end in a truncated conical portion having an exterior annular contacting surface, said body member having a lubricant conducting bore extending therethrough and opening through said last mentioned end, said bore increasing in diameter toward the opposite end, a valve seat between two of the larger portions of said bore, a valve, and a spring for holding said valve on its seat, the end of said body member opposite said contacting surface having means for rigidly attaching it to a bearing.

9. As an article of manufacture, a fitting for a contact pressure-lubricating system comprising a body member having a contact end and a securing end, said body member having a bore extending therethrough and opening through both of said ends, that portion of the bore opening through said contact end being open, a valve seat intermediate the ends of said bore, a valve, and a spring for yieldingly holding said valve against said seat, the portion of said bore opening through said contact end being smaller than the portion of said bore between it and said valve seat, thereby forming a lubricant holding chamber.

10. A fitting for a contact pressure-lubricating system comprising a body member having a securing end and a truncated conical contacting end bounded by a contact circle of small area, said body member having a bore extending therethrough, said bore increasing in diameter in successive stages, and opening through said ends, that portion of said bore opening through said contact end being open.

11. A lubricant nipple comprising a body having a bore, the inlet end of said bore being of minimum diameter for admission of lubricant, said bore being enlarged to form a shoulder axially spaced from said inlet, and a check valve member fitting against said shoulder.

12. A fitting for a contact pressure-lubricating system comprising a body having a bore, the inlet end being of minimum diameter for admission of lubricant, said minimum diameter portion being as short as possible for strength and enlarging immediately, a spring pressed check valve adapted to seat over the end of the enlarged portion, closure of said valve after injection extruding enough grease from said inlet to form a cake with dust particles, which cake can be wiped off without getting dust into the inlet passage itself.

13. A fitting for a contact pressure-lubricating system comprising a body having a bore, the inlet end being unobstructed and of minimum diameter for admission of lubricant, a surface surrounding said inlet and bounded by a circular dirt cutting edge enclosing a minimum area, said minimum diameter portion of the bore being as short as possible for strength and enlarging immediately, a spring pressed check valve adapted to seat over the end of the enlarged portion, closure of said valve after injection extruding enough grease from said inlet to form a cake with dust particles, which cake can be wiped off without getting dust into the inlet passage itself.

14. As an article of manufacture, a fitting for a pressure-lubricating system having an inlet opening of minimum diameter and a contact surface of small diameter, said contact surface being bounded by a circular dirt cutting edge.

15. As an article of manufacture, a fitting for a contact pressure-lubricating system having a bore with an unobstructed outer end of minimum diameter, and a check valve in said bore spaced from said end and exposed to the pressure of the lubricant over an area greater than that of said outer end.

In testimony whereof I hereunto affix my signature this 16th day of July, 1924.

OSCAR U. ZERK.